(12) United States Patent
Brandenburger et al.

(10) Patent No.: US 11,325,295 B2
(45) Date of Patent: May 10, 2022

(54) METHOD AND APPARATUS FOR PRODUCING A FILLED SBM BOTTLE

(71) Applicant: Fresenius Kabi Deutschland GmbH, Bad Homburg (DE)

(72) Inventors: Torsten Brandenburger, Reichelsheim (DE); Andreas Pfeffer, Grünberg (DE); Christian Frensch, Hofheim (DE)

(73) Assignee: Fresenius Kabi Deutschland GmbH, Bad Homburg (DE)

( * ) Notice: Subject to any disclaimer, the term of this patent is extended or adjusted under 35 U.S.C. 154(b) by 147 days.

(21) Appl. No.: 16/711,813

(22) Filed: Dec. 12, 2019

(65) Prior Publication Data

US 2020/0189169 A1 Jun. 18, 2020

Related U.S. Application Data

(63) Continuation of application No. 15/024,134, filed as application No. PCT/EP2014/070131 on Sep. 22, 2014, now Pat. No. 10,507,611.

(30) Foreign Application Priority Data

Sep. 24, 2013 (EP) .................................... 13185818

(51) Int. Cl.
  *B29C 49/08* (2006.01)
  *B29C 49/42* (2006.01)
  (Continued)

(52) U.S. Cl.
  CPC .............. *B29C 49/08* (2013.01); *B29B 11/00* (2013.01); *B29C 49/4242* (2013.01);
  (Continued)

(58) Field of Classification Search
  None
  See application file for complete search history.

(56) References Cited

U.S. PATENT DOCUMENTS

| 4,395,378 A | 7/1983 | Alberghini et al. |
| 5,540,579 A | 7/1996 | Uehara et al. |
| (Continued) | | |

FOREIGN PATENT DOCUMENTS

| EP | 0 483 671 | 10/1996 |
| EP | 2 716 430 | 4/2014 |
| (Continued) | | |

*Primary Examiner* — Monica A Huson
(74) *Attorney, Agent, or Firm* — Occhiuti & Rohlicek LLP

(57) ABSTRACT

A method for producing a sterilized container comprises: providing a preform having a hanger arranged on a bottom of the preform, heating the preform in a heating device, feeding the heated preform into a stretching and blowing apparatus, stretching and blowing the preform in the stretching and blowing apparatus such that the container for the infusion solution is formed from the preform, cleaning the formed container in a rinsing apparatus, and drying the cleaned container in a drying device, filling the cleaned and dried container at least with an infusion solution, via a filling opening present in the container, in a filling plant, closing the container by attaching a closure cap to the filling opening of the container, sterilizing the closed container in an autoclave, wherein the hanger of the preform is oriented and folded over by a bending apparatus prior to stretching and blowing in the stretching and blowing apparatus.

20 Claims, 9 Drawing Sheets

Figure 1:
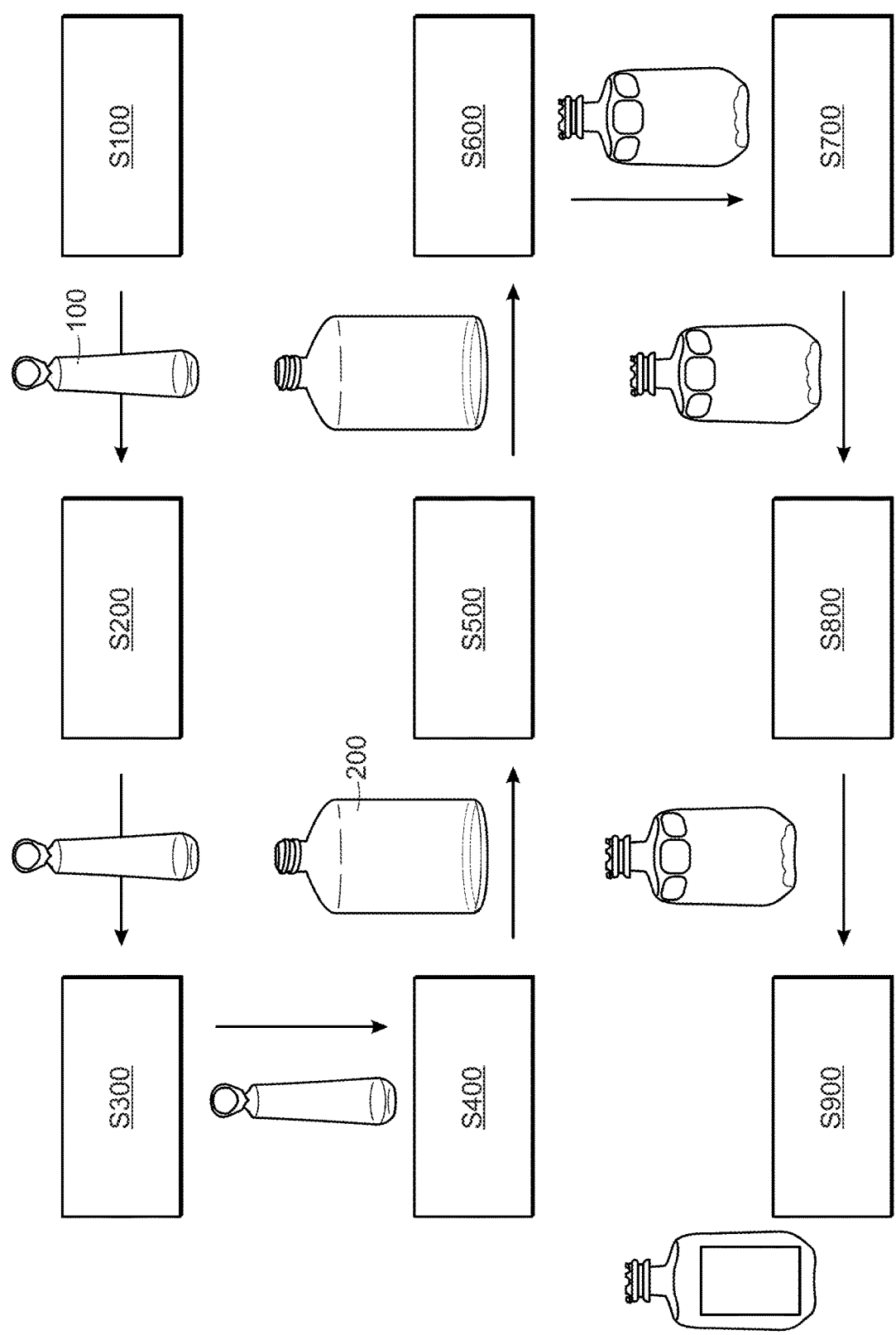

(51) Int. Cl.
*B29C 49/64* (2006.01)
*B29B 11/00* (2006.01)
B29C 49/06 (2006.01)
B29C 49/12 (2006.01)
B29C 49/20 (2006.01)
B29L 31/00 (2006.01)

(52) U.S. Cl.
CPC .......... *B29C 49/64* (2013.01); *B29C 49/6436* (2013.01); *B29B 2911/14513* (2013.01); *B29C 49/06* (2013.01); *B29C 49/12* (2013.01); *B29C 49/4273* (2013.01); *B29C 2049/2017* (2013.01); *B29C 2049/2034* (2013.01); *B29L 2031/712* (2013.01); *B29L 2031/7158* (2013.01)

(56) References Cited

U.S. PATENT DOCUMENTS

2005/0156350 A1     7/2005   Rehan
2011/0240673 A1* 10/2011   Araujo ................ B65D 1/0292
                                                                                                                      222/105

FOREIGN PATENT DOCUMENTS

| JP | H07 80920 | 3/1995 |
| JP | H07 148829 | 6/1995 |
| JP | 3467300 B2 | 11/2003 |
| WO | 2012/161150 | 11/2012 |

* cited by examiner

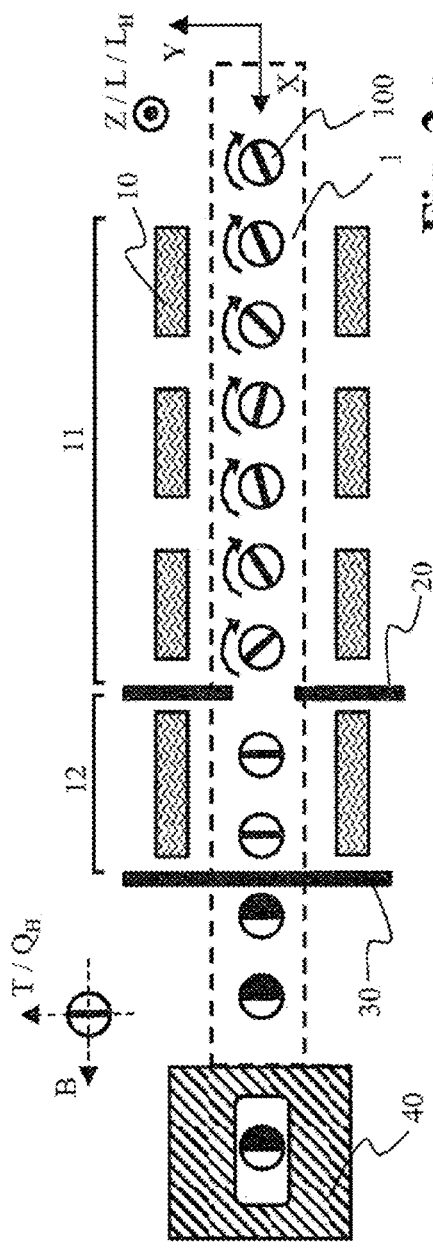
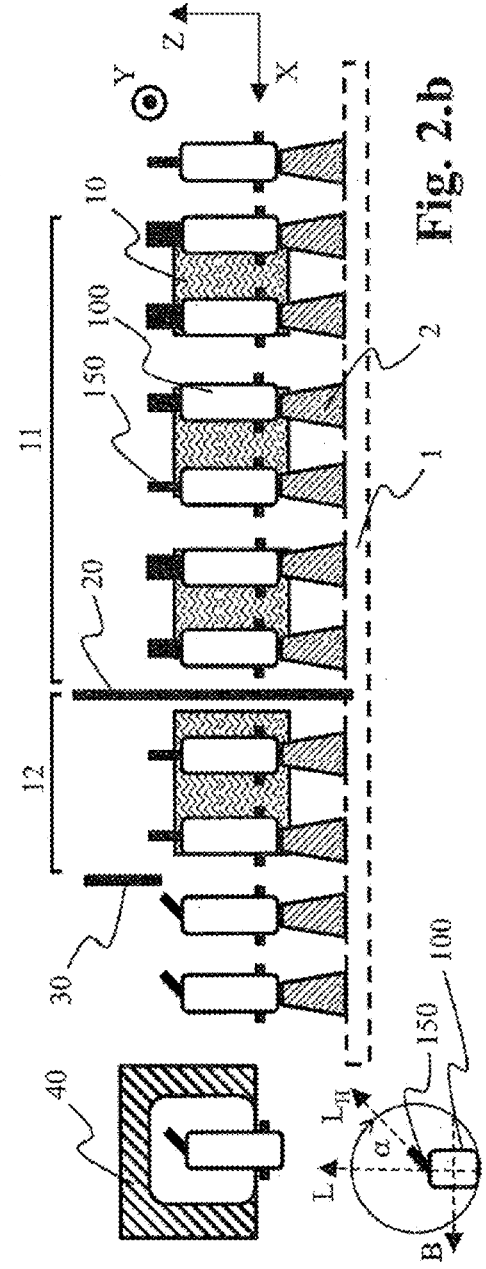
Fig. 2.a
Fig. 2.b

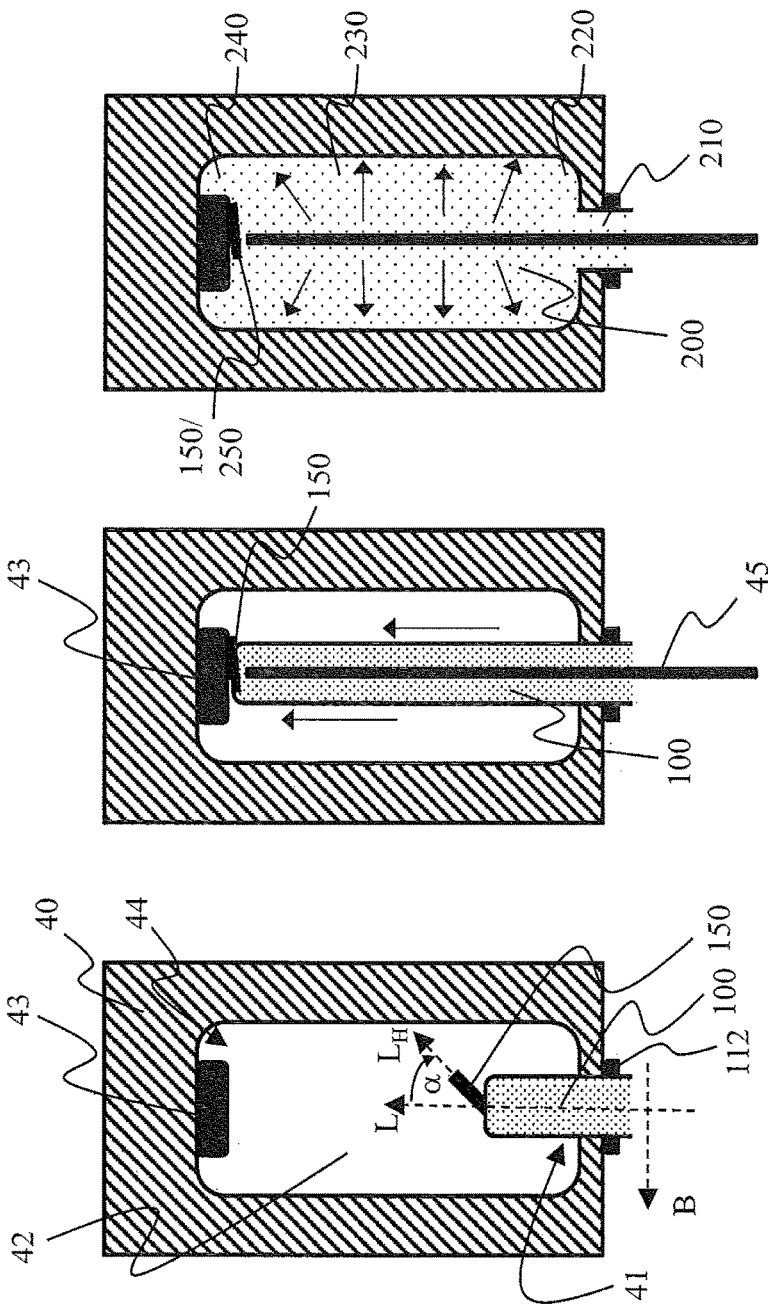

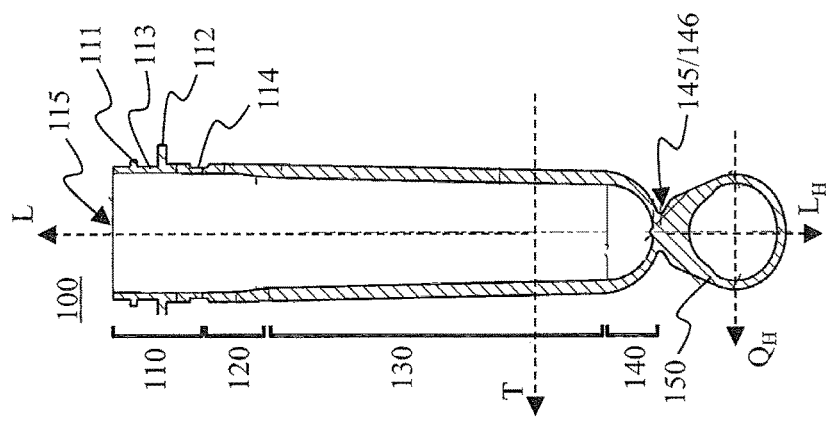
Fig. 4.b
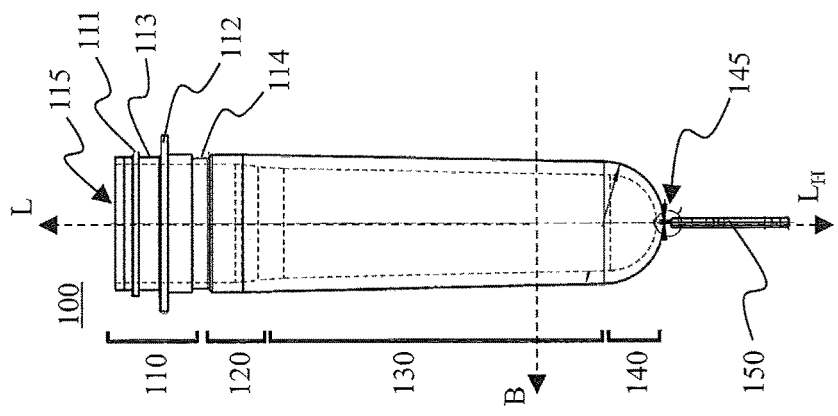
Fig. 4.a

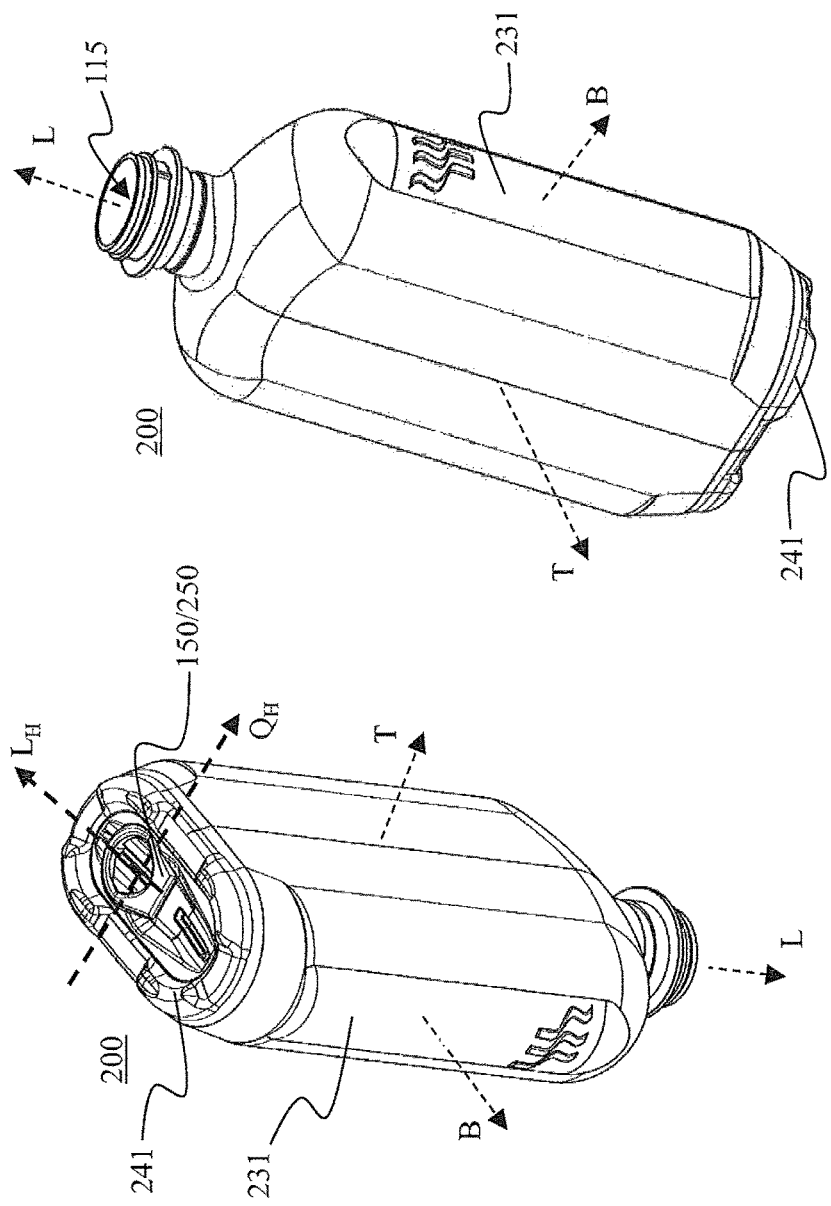

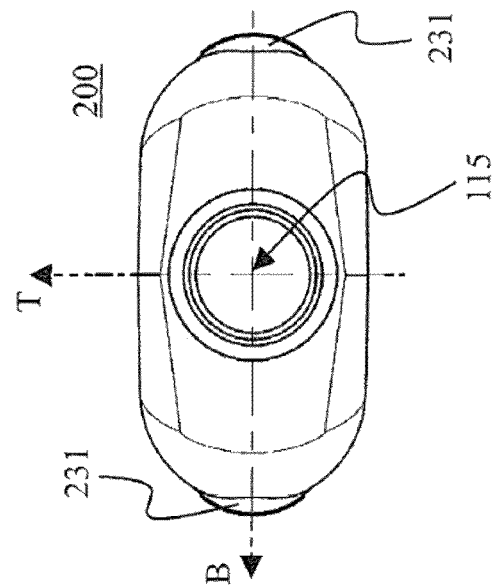
Fig. 5.d
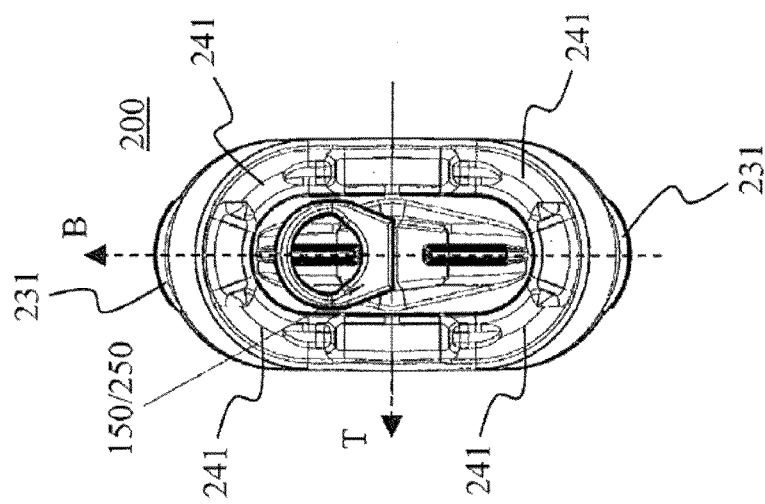
Fig. 5.c

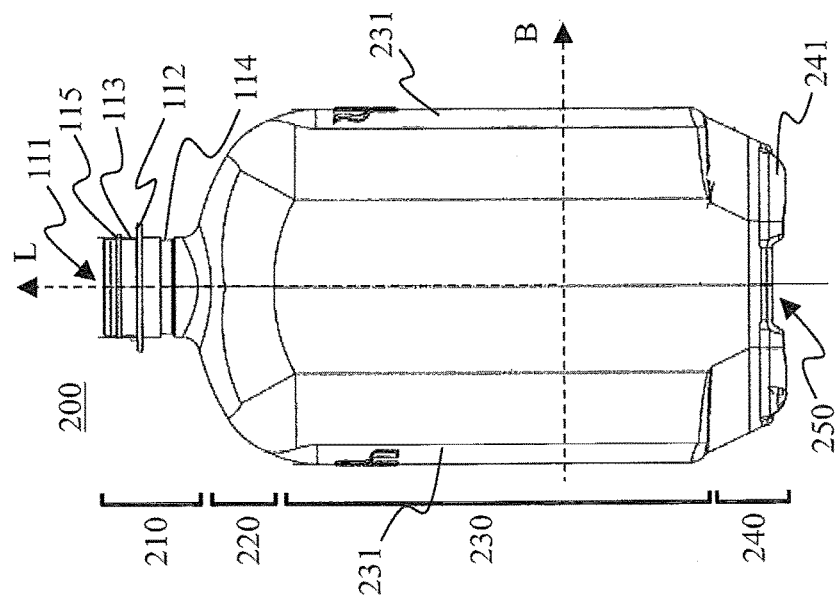
Fig. 5.f
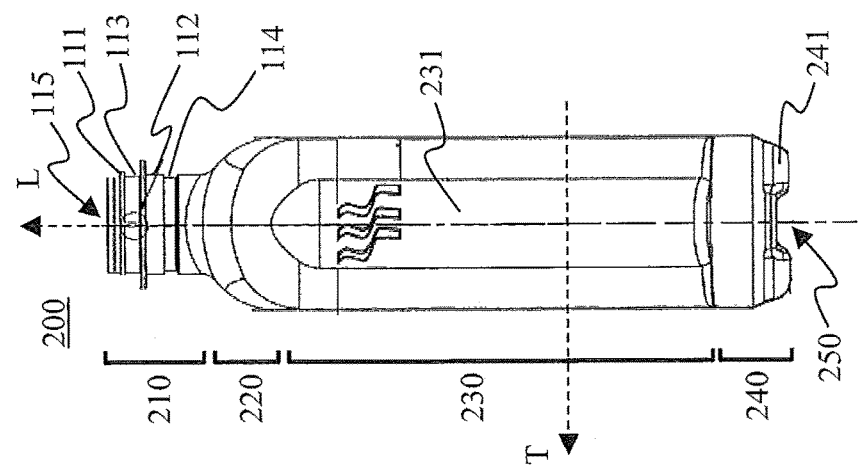
Fig. 5.e

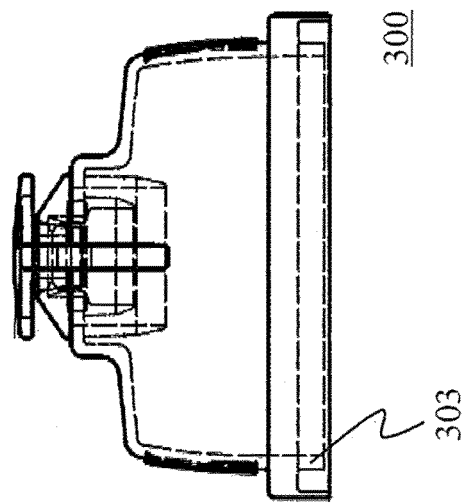
Fig. 6.b
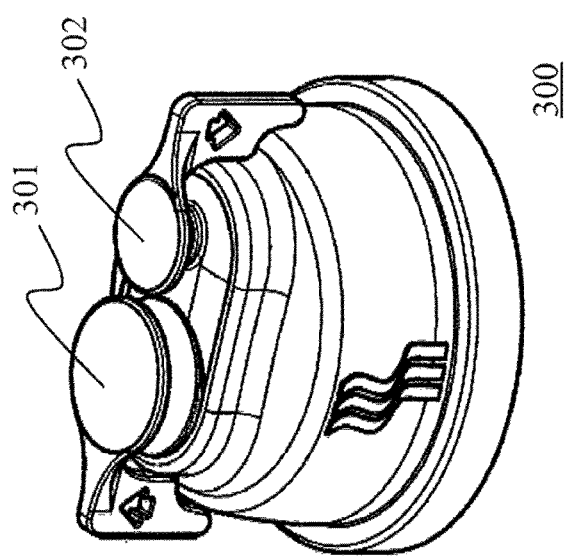
Fig. 6.a

METHOD AND APPARATUS FOR PRODUCING A FILLED SBM BOTTLE

CROSS-REFERENCE TO RELATED APPLICATIONS

This application is a continuation of U.S. application Ser. No. 15/024,134, filed Mar. 23, 2016, now U.S. Pat. No. 10,507,611, which is a National Stage of International Application No. PCT/EP2014/070131, filed on Sep. 22, 2014, which claims priority to European Application No. 13185818.5, filed on Sep. 24, 2013, the contents of which are hereby incorporated by reference in their entirety.

SPECIFICATION OF THE INVENTION

The present invention relates to a sterilized container which is filled with an infusion solution, and to a method and a system for producing the sterilized container.

GENERAL DESCRIPTION OF THE INVENTION

Containers for receiving liquids for medical applications must meet particular requirements, in particular in terms of sterility. For example, bottles from extruded PE which are brought to the desired shape, filled, and then subsequently hermetically closed in one operation by stretching and blow molding (blow-fill-seal method) are known. The known containers for infusion solutions or enteral nutrient solutions are generally suspended on a stand. To this end, the containers dispose of a tab. These tabs are generally configured as eyelets, so as to be able to suspend the bottle from a hook. However, production of a container produced by means of blow-fill-seal technology is rather high, since an extrusion system is required besides the blow-fill-seal system.

A method and a mold for producing an infusion repository which disposes of an annular tab on the base of a bottle are described in EP 0 483671 B1. The bottle by way of stretching and blowing (stretch-blow-molding method, SBM for short) is produced from a preform. The actual preform together with the annular tab is made by an injection-molding method. The production method by means of stretching and blowing is distinguished in that a further operational step for fastening the tab after blow molding is not required. The mold in which the preform is blown has on the base a clearance for receiving the hanger, which is fastened to the base of the preform, during blowing. However, if blowing is not carried out in a sufficiently precise manner, the hanger may miss the clearance and then may permanently adhere to the main body of the blown bottle and/or impede the blown main body in terms of tightness of the latter.

A container produced by means of SBM, having a hanger, is described in EP 2 716 430 A1. The width of the produced container is larger than the depth thereof. It is generally stated that the hanger is tilted between the preform being produced by injection molding and the container being blow molded from the preform. There are no more details to be found. The hanger here is tilted in the direction of the depth, which is smaller than the width, toward the lower side of the container.

Against the background narrated above, the present invention is based on the object of at least reducing the aforementioned disadvantages. In particular, it should be possible for a container for an infusion solution to be reliably and readily produced by means of stretch-blow molding.

This object is achieved by the subject matter having the features of the independent patent claims. Advantageous embodiments are the subject matter of the description, of the figures, and of the dependent claims.

In detail, the present invention is described by a method for producing a container filled preferably with an infusion solution and having a main body which includes a width extending along a first transverse axis of the container, and a depth extending along a second transverse axis of the container, which runs perpendicularly to the first transverse axis, and wherein the width of the main body is larger than the depth of the main body, the method comprising the following method steps:

providing a preform having a hanger which is disposed on a base of the preform, wherein a transverse axis of the hanger is disposed so as to be substantially transverse, preferably perpendicular, to the first transverse axis of the container;

heating the provided preform in a heating installation;

infeeding the heated preform to a stretching and blowing apparatus;

stretching and blowing the preform in the stretching and blowing apparatus such that the container for the infusion solution is molded from the preform;

in particular cleaning the molded container, preferably in a rinsing installation; and optionally drying the cleaned container in a drying installation;

filling the container which in particular has been cleaned and optionally dried with at least one infusion solution or with a liquid for medicinal purposes in a filling system, by way of a filling opening which is present in the container in the form of an opened bottleneck, for example;

closing the container by attaching a closure, preferably a closure cap, to the filling opening of the container;

sterilizing the closed container, preferably in an autoclave, or in a sterilizing installation in general, wherein the hanger of the preform prior to stretching and blowing in the stretching and blowing apparatus is aligned and, in particular by a bending apparatus, is turned over or bent in the direction of the first transverse axis of the container molded from the preform. In particular, the preform along the circumference thereof is not heated in a substantially uniform manner.

The hanger is turned over or bent in the direction of the first transverse axis of the container, along which the width of the container is defined, in the direction of the lower side of the produced container. On account of the rotationally non-symmetrical design embodiment of the produced container and the chosen orientation of the hanger in relation to the container, production of the container is in particular simplified. In one embodiment of the method, the sides of the container that after stretching and blowing form the width of the container that is larger in relation to the depth may in this way be heated more intensely in the heating installation, and the hanger may moreover by turned over by the bending apparatus.

The invention may also be is described by a method for producing a container filled preferably with an infusion solution, the method comprising the following method steps: providing a preform having a hanger which is disposed on a base of the preform; heating the provided preform in a heating installation; infeeding the heated preform to a stretching and blowing apparatus; stretching and blowing the preform in the stretching and blowing apparatus such that the container for the infusion solution is molded from the preform; in particular cleaning the molded container, preferably in a rinsing installation, and optionally drying the cleaned container in a drying installation; filling the container which in particular has been cleaned and optionally dried with at least one infusion solution or with a liquid for medicinal purposes in a filling system, by way of a filling opening which is present in the container in the form of an opened bottleneck, for example; closing the container by attaching a closure, preferably a closure cap, to the filling opening of the container; sterilizing the closed container, preferably in an autoclave or in a sterilizing installation in general, wherein the hanger of the preform prior to stretching and blowing in the stretching and blowing apparatus is aligned and, in particular by a bending apparatus, is turned over or bent in particular and/or wherein the preform along the circumference thereof is not heated in a substantially uniform manner.

By bending the hanger, the preform may be blown in the stretching and blowing apparatus in such a manner that the container molded from the preform on the lower side thereof has an integral, preferably pivotable hanger which does not permanently adhere to the blown main body of the container.

Within the scope of the invention there is also a system for filling a container or for producing a container filled with an infusion solution, the system comprising:

an installation for providing a preform, in particular having a hanger disposed on a base of the preform;
a heating installation for heating the provided preform;
an apparatus for stretching and blowing the preform such that the container for the infusion solution is moldable from the preform;
in particular an installation for cleaning the molded container, preferably a rinsing installation, and optionally an installation for drying the cleaned container;
a filling system in which the container which in particular has been cleaned and optionally dried by way of a filling opening which is present in the container may be filled at least with one infusion solution;
an installation for closing the container,
an autoclave or a sterilizing installation in general in which the closed container (200) is sterilizable; and
a first conveying installation for guiding the preform in the heating installation and/or in particular for infeeding the heated preform to the stretching and blowing apparatus in which the preform is rotatably mounted and may be aligned by way of rotation, and/or a bending apparatus which is disposed ahead of the stretching and blowing apparatus and in which the preferably pre-aligned hanger of the preform may be turned over.

While not explicitly mentioned here, further, for example second or third conveying installations which enable conveying of the preform and/or of the empty container and/or of the filled container and/or of the closed container and/or of the sterilized container in the system according to the invention may however be provided. In one embodiment the first conveying installation has at least one movably disposed rotary pin on which the preform is mountable or is mounted and by way of which rotation of the preform is providable or is provided.

In one design embodiment, the bending apparatus is providable by an edge which is disposed ahead of the stretching and blowing apparatus, for example in or after the heating installation. Said edge in relation to the first conveying installation is preferably disposed so as to be locationally fixed and laterally offset such that the hanger of the preform by means of the movement of the first conveying installation may be moved against the edge, be brought to bear and bent thereon.

Preferably, the preform is aligned such that a transverse axis $Q_H$ of the hanger lies so as to be substantially transverse, preferably perpendicular, to a movement direction of the preform. The preform may be aligned already upon being provided, heated and/or only upon being infed to the stretching and blowing apparatus.

In one embodiment of the invention, the hanger of the preform is bent away by means of the bending apparatus from a longitudinal axis L of the preform in the direction of the base or of the lower side of the preform. The hanger may initially stand upright on the base or of the lower side of the preform. The longitudinal axis $L_H$ of the hanger in this case may run substantially parallel with the longitudinal axis L of the preform. By way of the bending apparatus, the hanger in relation to the longitudinal axis L of the preform may be bent to an angle of $45°\leq\alpha\leq110°$, or to $\leq$approx. 90°. Said hanger is preferably to an angle of $70°\leq\alpha\leq95°$, or to $\leq$approx. 90°. In one preferred variant, said hanger is bent to an angle of $\alpha\cong90°$.

The container molded from the preform is defined by a longitudinal axis L, a first transverse axis B running perpendicularly to the longitudinal axis, and by a second transverse axis T running perpendicularly to the first transverse axis. The height of the container is defined in the direction of the longitudinal axis L. The width of the container is defined in the direction of the first transverse axis B. The depth of the container is defined in the direction of the second transverse axis T. The side walls or the regions of the container that extend in the direction of the first transverse axis B of the container are longer than the side walls or the regions of the container that extend along the second transverse axis T of the container. The container is thus wider than it is deep. In one embodiment, the container molded from the preform has a main body which has a cross section which is at least substantially oval or elliptic.

When the hanger stands upright the longitudinal axis $L_H$ of the hanger runs in the direction of the longitudinal axis L of the preform and/or of the container. The former then preferably lies on the longitudinal axis L of the preform and/or of the container. By contrast, the transverse axis $Q_H$ of the hanger lies transversely, preferably perpendicularly to the longitudinal axis L of the preform and/or of the container.

In one embodiment, the container molded from the preform upon stretching and blowing is imparted a main body which includes a width extending along the first transverse axis B of the container, and a depth extending along a second transverse axis T of the container that runs perpendicularly to the first transverse axis B, wherein the width is larger than the depth and the preform prior to stretching and blowing in the stretching and blowing apparatus is aligned such that the second transverse axis T is disposed so as to be substantially transverse, preferably perpendicular, to the movement direction of the preform.

In order for the larger extent to be achieved in the width in particular, two mutually opposite sides or regions of the preform that then provide the width of the container molded from the preform are heated more intensely than two mutually opposite sides or regions of the preform that then provide the depth of the container molded from the preform.

Differential heating may be achieved in that the preform along the circumference thereof is heated in a substantially uniform manner, and the mutually opposite side walls or regions of the preform that then provide the width of the container molded from the preform are provided with a thinner wall thickness than the two mutually opposite sides that then provide the depth of the container molded from the preform.

In another embodiment, the preform along the circumference thereof at least in portions is provided with a substantially uniform wall thickness. Differential heating may then be achieved in that the preform along the circumference thereof is heated in a substantially non-uniform manner. For example, the preform along the circumference thereof in the heating installation is initially heated in a substantially uniform manner. Thereafter, prior to being infed to the stretching and blowing apparatus, the two mutually opposite sides or regions of the preform that then provide the width of the container molded from the preform are more intensely heated.

To this end, the preform in one embodiment is moved through the heating installation and along the circumference of the former is rotated at least in one first portion of the heating installation. Preferably, while the preform is moved through the heating installation, rotation of the preform in the heating installation is stopped and the preform is aligned such that the transverse axis $Q_H$ of the hanger is disposed so as to be substantially transverse, preferably perpendicular, to the movement direction of the preform. On account thereof, the side walls or regions of the preform that are more intensely heated face the heating installations.

In one further embodiment, the stretching and blowing apparatus is provided having a mold which on a lower side at least in portions has an elevation which along a circumference is at least in portions or completely surrounded by a trench, wherein the heated preform is initially stretched such that at least the hanger and/or the base of the preform, in particular at least in portions, come/comes to bear on the elevation and the preform is then blown such that the latter at least in portions comes to bear in the trench, and a plurality of feet or at least one foot are/is molded therein.

In one specific design embodiment, the closure is provided as a closure cap. In particular, the closure cap and/or the filling opening of the container are/is heated at least in portions, wherein closing of the container is performed in that the closure cap is welded onto the filling opening of the container. The closure cap is preferably produced by means of injection molding.

Finally, the following method steps may still be carried out on the container: checking the sterilized container in an inspection installation, and/or attaching a label to the checked container, and/or disposing a multiplicity of labeled containers in a carton, and closing the carton. On account of the oval and non-circular basic shape of the container, a high packing density may be achieved. For example, checking comprises at least one preferably camera-based visual inspection, and/or one tightness test, and/or one filling-level measurement, preferably by means of weighing.

The afore-described method steps according to the invention may also be implemented by corresponding installations which are configured or suitable for carrying out the described method steps.

Within the scope of the invention there is also a sterilized container having a main body which is stretched and blown from a preform and is filled with an infusion solution, which sterilized container toward the top by way of a shoulder region transitions to a bottleneck having a filling opening which is closed by a closure, and toward the bottom transitions to a base region, wherein the main body of the sterilized container has a width extending along a first transverse axis B of the container, and a depth extending along a second transverse axis T of the container, which runs perpendicularly to the first transverse axis. The container is moreover defined in that the width of the main body is larger than the depth of the main body, and in that side walls of the main body that extend in the direction of the width of the container at least in portions have a smaller thickness than side walls which extend along the depth of the container, and that a hanger which is integral to the main body of the container is disposed on a lower side of the container, and a transverse axis $Q_H$ of the hanger is disposed so as to be substantially transverse, preferably perpendicular, to the first transverse axis B of the container, and the hanger is bent or placed in the direction of the lower side of the container.

The wall thickness of the long sides of the container that provide the width of the container is at least in portions smaller than the wall thickness of the short sides of the container that provide the depth of the container. For example, the wall thickness of the long sides of the container at least in portions is in the range of approx. 0.1 mm to approx. 1.5 mm, and/or the wall thickness of the short sides of the container at least in portions is in a range of approx. 0.01 mm to approx. 0.5 mm.

In a first embodiment, the container in the region of the sides of the container that extend in the direction of the second transverse axis and provide the depth of the container comprises in each case one preferably already stretched molded region. Preferably, this molded region has been provided in the as yet non-sterilized container as in each case one curvature. The latter is outwardly curved or arched. This curvature may extend along the longitudinal axis in a substantially complete manner across the main body of the container. The internal capacity of the container that increases during sterilizing may be compensated for by substantially non-elastic stretching of the molded region. By way of the stretched molded region the sterilized container during removal of liquid may have an improved collapsing behavior.

In one further embodiment of the container, a multiplicity of feet are configured in the base region. Said feet are disposed around the hanger, wherein the hanger in a state in which it is placed against the lower side of the container is located above a footprint of the feet. Preferably, four feet which are at least in portions arched and which in each case extend beyond a corner of the pedestal are configured in the base region. On account thereof, the tilting stability of the container may be improved.

In one further embodiment, in the region of the bottleneck between the first flange and the second flange an upper first depression, and below the first depression a second depression, by means of which the sterilized container may be gripped and transferred, are preferably provided. On account thereof, placing and connecting the closure may be facilitated.

Preferably, an upper first depression between the first flange and the second flange, and a second flange, below the first depression, by means of which the container may be gripped and/or transferred are provided in the region of the bottleneck. On account thereof, handling of the as yet not closed and/or of the closed container, for example by means of a gripper, may be simplified.

Within the scope of the invention there is furthermore a preform for producing the afore-described container according to the invention. The preform is preferably produced by means of injection molding. Said preform comprises an upper first portion for providing the bottleneck in the container molded from the preform by means of stretching and blowing; a second portion adjoining thereto in a downward manner, for providing the shoulder region in the container molded from the preform by means of stretching and blowing; a third portion adjoining thereto in a downward manner, for providing the main body in the container molded from the preform by means of stretching and blowing; a fourth portion adjoining thereto in a downward manner, for providing the base region in the container (200) molded from the preform by means of stretching and blowing; a fifth portion adjoining thereto in a downward manner, configured as a hanger, for providing the hanger in the container molded from the preform by means of stretching and blowing. In a first design embodiment the first portion and/or the fourth portion have/has a smaller wall thickness than the main body. On account thereof, stretching and blowing a container, in particular a bottle, having a rotationally non-symmetrical main body may be facilitated.

In a further embodiment of the preform, a rounded or at least in portions rounded transition region is configured between the fourth portion and the hanger as the fifth portion. In one specific design embodiment the rounded or arched feature is configured on two mutually opposite sides of the transition region. The rounded feature is preferably configured on both sides of the transition region that extend in the direction of the articulation axis of the hanger. On account thereof, mobility of the hanger may be improved without the strength of the connection to the base region of the container being substantially impeded. In a further design embodiment, yet two lateral notches are present. These lateral notches are preferably rounded at least at the respective apex thereof. In a further design embodiment the hanger along the transverse axis thereof has a width which, proceeding from the transition along the longitudinal axis of the hanger, initially increases and then again decreases. On account thereof, the required transition, on the one hand, and a sufficiently large stop face for the bending apparatus for turning over the hanger, on the other hand, are provided. Preferably, the features of the hanger which are mentioned in the context of the preform are substantially present also on the sterilized container.

The method according to the invention is capable of being carried out in particular by means of the system according to the invention. The system according to the invention is configured for carrying out in particular the method according to the invention. The sterilized container according to the invention is producible or is produced in particular by way of the method according to the invention. The sterilized container according to the invention is producible or is produced in particular from the preform according to the invention.

The container may have a capacity of approx. 100 ml to approx. 1000 ml, for example. The system and/or the method and/or the sterilized container according to the present invention may be used in particular for infusion solutions or else for medical liquids in general. The medical liquid is a liquid which is employed for medical purposes. In one preferred embodiment the medical liquid is an infusion solution. Potential examples of such infusion solutions comprise sterile water; saline solutions; in particular solutions with NaCl, KCl, CaCl and/or Mg; solutions with hydrocarbons, in particular glucose solutions; solutions with nutrients for parenteral nutrition and/or colloid solutions, in particular for blood substitute therapy (voluven, for example).

In one preferred embodiment of the invention the container is a bottle, in particular a plastic bottle. The bottle comprises the hanger, a base region, a main body or a bottle body, a shoulder region, and a bottleneck.

In one preferred embodiment the material for the preform and/or for the closure cap is or comprises polypropylene. The polypropylene is preferably produced according to Ph. Eur. 3.1.6 (EUREOPEAN PHARMACOPOEIA). This material is sterilizable at 121° C. Moreover, the material may be employed both in an injection molding method as well as in a stretch-blow-mold method. Furthermore, this material has good impermeability to gas and water.

Moreover, a sterilized container which is filled with clear liquid, preferably with a clear infusion solution, has excellent and glass-like transparency, in particular in the jacket region or the bottle body thereof. When the container by way of the wide side thereof is placed onto a page with printed letters, for example, the letters may be identified through the container without any substantial problems. While the preform is substantially light-permeable yet not transparent, possesses, the transparent properties are imparted to the container by stretching. The side walls which provide the width of the container at least in portions have higher transparency than the side walls which provide the depth of the container. After all, the former are more intensely stretched or stretched to a greater degree, respectively. Moreover, on account of being more intensely stretched, the container is imparted good collapsing properties during the removal of liquid. In particular the bottleneck and/or the shoulder region and/or the base region, since they are not stretched and blown, or not stretched and blown to the same degree as the bottle body, have a larger wall thickness and thus lower transparency.

The present invention will be explained in detail by means of the following exemplary embodiments. To this end, reference will be made to the appended drawings having the schematic illustrations. The same reference signs in the individual drawings refer to the same parts.

Figure 7A:
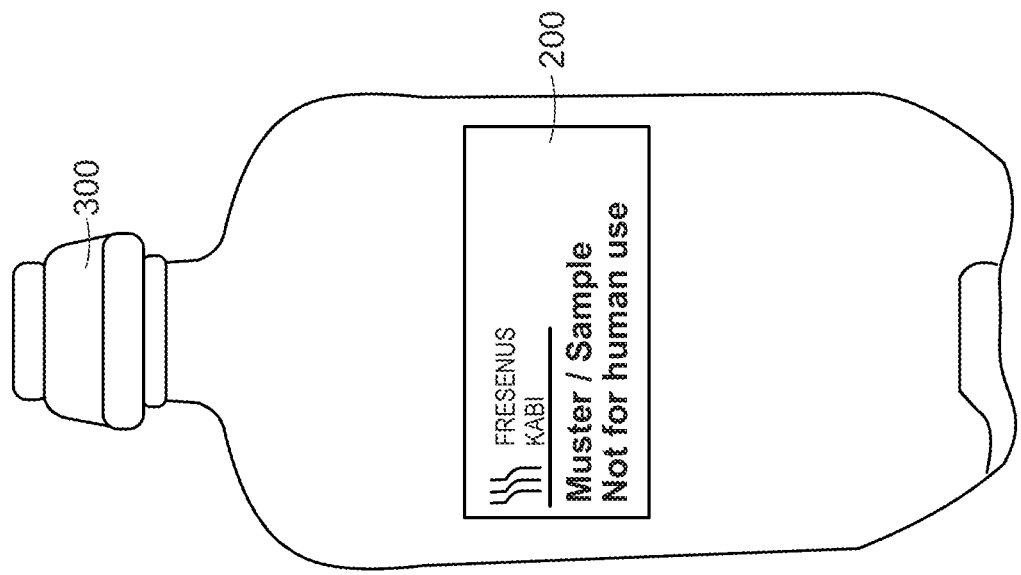
Figure 7B:
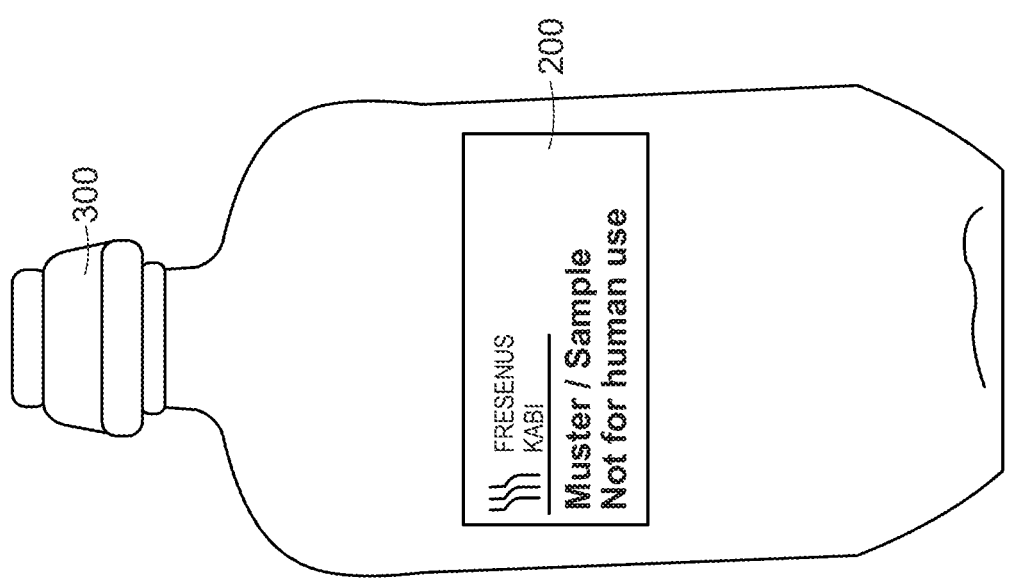

FIG. 1 shows an embodiment of the method according to the invention and of the system according to the invention in a block diagram;

FIGS. 2.*a* and 2.*b* show an embodiment of heating and aligning the preform, of turning over the hanger on the preform, and of infeeding the preform to the mold for stretching and blowing, in a schematic illustration of a plan view of the system (FIG. 2.*a*) and of a side view (FIG. 2.*b*);

FIGS. 3.*a* to 3.*c* show an embodiment of a mold according to the invention for stretching and blowing, having an inserted preform (FIG. 3.*a*), having an inserted elongation lance and an elongated or stretched preform (FIG. 3.*b*), respectively, and the container (FIG. 3.*c*) blown from the preform, in a schematic illustration;

FIGS. 4.*a* and 4.*b* show an embodiment of a preform according to the invention in a side view (FIG. 4.*a*) and in a cross section (FIG. 4.*b*);

FIGS. 5.*a* to 5.*f* show an embodiment of a container according to the invention that has not yet been filled, in a perspective view onto the lower side (FIG. 5.*a*) and onto the upper side (FIG. 5.*b*), in a plan view of the lower side (FIG. 5.*c*) and of the upper side (FIG. 5.*d*), in a side view onto the short side of the container or onto the depth thereof, respectively (FIG. 5.*e*), and onto the long side of the container or onto the width thereof, respectively (FIG. 5.*f*);

FIGS. 6.*a* and 6.*b* show an embodiment of a cap according to the invention for closing the container, in a perspective view (FIG. 6.*a*) and in a cross section (FIG. 6.*b*); and FIGS. 7.*a* and 7.*b* show an embodiment of a container according to the invention, filled with an infusion solution, prior to (FIG. 7.*a*) and post (FIG. 7.*b*) sterilizing.

Firstly, FIG. 1 offers an overview of the method and of an associated system for producing a container 200 filled with an infusion solution. The container 200 here is embodied as a bottle. The preforms 100 are provided in a first step S100. This is performed by an installation for providing a preform 100. An example of such an apparatus is a robotic arm with a gripper. The preforms 100 on the base thereof have in each case one hanger 150.

Heating of the preforms 100 in a heating installation 10 is performed in a next step S200. The heating installation 10 may be provided by a preferably electric radiator-type heating unit. The preforms 100 are initially heated such that each preform 100 has been or is heated in a substantially uniform manner. Thereafter, the preferred heating of individual part-regions of the preforms 100 is performed. Heating is of such a manner that the preforms 100 thereafter are no longer uniformly heated and during subsequent stretching and blowing may expand in a variable manner. Prior to the preferred heating, the preforms 100 have still to be aligned so as to correspond to the orientation of the hangers 150. In a next step S300, the hangers 150 of the preforms 100 are bent by a bending apparatus 30. The details pertaining to steps S200 and S300 are stated in the description of FIGS. 2.a and 2.b.

The heated preforms 100 are infed to a stretching and blowing (stretch-blow-mold) apparatus 40. The containers 200 are molded in a step S400 by stretching and blowing the preforms 100. In a next step S500, cleaning of the molded containers 200, for example in a rinsing apparatus, and optionally drying of the cleaned containers, for example by means of an air stream and/or by means of heat, is performed.

Filling of the cleaned and optionally dried containers 200 with an infusion solution is performed in a next step S600. Filling is performed in a filling system by way of a filling opening 115 which is present in the container 200, here by way of an opened bottleneck 210. The filled containers 200 are then closed (step S700), for example by attaching a closure cap 300 onto the filling opening 211 of the container 200. The closed containers 200 are sterilized, for example in an autoclave, in a next step S800. After sterilizing, the containers 200 and the liquids contained therein are suitable in particular for infusion applications.

Subsequently, checking of the sterilized container 200 in an inspection installation, labeling the containers 200, disposing the labeled containers 200 in a carton, and/or closing the carton still take place. This is collectively included in step S900. Checking comprises, for example, visual inspection, preferably by means of a camera, a tightness test, preferably by means of a pressure cuff, and/or measurement of the filling level, preferably by means of scales.

Conveying installations for transferring the preform 100, and/or the empty container 200, and/or the filled container 200, and/or the closed container 200, and/or the sterilized container 200 are not illustrated in the figures. Such conveying installations may be present in the form of a robotic arm having a gripper, and/or of a conveyor belt having mounts, and/or of a carousel having gripper elements, for example. A first conveying installations 1 is only illustrated in the following FIGS. 2.a and 2.b.

FIGS. 2.a and 2.b show an embodiment for heating and aligning the preform 100, for turning over the hanger 150 on the preform 100, and for infeeding the preform 100 to the mold 40 for stretching and blowing. The preforms 100 may already be aligned during providing. Aligning of the preforms 100 here is performed in an exemplary manner only during heating in the heating installation 10.

The preforms 100 are moved on a first conveying installation 1 through the heating installation 10 and infed to the stretching and blowing apparatus 40. The movement direction of the first conveying installation 1 is identified as the X axis and lies in the plane of the sheet. The Y axis is perpendicular to the X axis in the sheet plane and is thus perpendicular to the movement direction X of the preforms 100. The Z axis is perpendicular to the XY plane and thus to the sheet plane. The preforms 100 are disposed such that the longitudinal axes L thereof extend along the Z axis. The preforms 100 or the hangers 150 of the preforms 100, respectively, prior to bending the hanger 150 are aligned in the direction of the Y axis (to this end, refer to the text hereunder).

As illustrated, the first conveying installation 1 may be a type of conveyor belt or else a carousel which at one side (here illustrated to the right) receives the preforms 100 and infeeds the latter to the stretching and blowing apparatus 40. Once the heated preforms 100 have been transferred, said first conveying installation 1 returns in order for further preforms 100 to be received. However, this is not illustrated in the figures.

The first conveying installation 1 has a multiplicity of rotary pins 2 which are moved by movement of the first conveying installation 1 in the direction X. In each case one preform 100 is rotatably mountable or mounted on one rotary pin 2. A multiplicity of heating installations 10 are disposed along the first conveying installation 1. Said heating installations 10 here in an exemplary manner are disposed in pairs and so as to be mutually opposite. Instead of two mutually opposite heating installations 10, in particular in each case one heating installation and one reflector lying opposite thereto may also be employed.

In a first portion 11 of the heating installation 10 the preforms 100 are preferably continuously rotated by rotation of the rotary pins 2. On account thereof, the preforms 100 in this first portion 11 of the heating installation 10 are initially heated in a substantially uniform manner.

In a second portion 12 of the heating installation 10 rotation of the preforms 100 is absent. However, before the preforms 100 are infed to this second portion 12 of the heating installation 10, the former are aligned. Here, they are aligned by way of a corresponding alignment of the rotary pins 2. The preforms 100 are aligned such that the transverse axis $Q_H$ of the hangers 150 are disposed so as to be transverse, preferably perpendicular to the movement direction X of the first conveying installation 1. Supervision and any optionally required correction by readjusting the orientation of the rotary pins is performed by an optical monitoring system 20, for example.

In the second portion 12 of the heating installation 10 those regions of the preforms 100 that are assigned to the laterally disposed heating installations 10 are now heated more intensely than those regions that are disposed so as to be perpendicular thereto. The side walls of the preforms are now heated or are warm in a non-uniform manner. In detail, those regions of the preforms 100 that extend along the first transverse axis B of the preform are now more intensely heated. The warmer and thus softer regions later form the long sides of the molded container 200, namely the width of the latter. The colder and thus also less soft regions later form the short sides of the molded container 200, namely the depth of the latter.

In a subsequent step, the hangers 150 of the aligned preforms 100 which are now heated in a non-uniform manner are bent or turned over. A bending apparatus 30 is provided to this end. The bending apparatus 30 here is provided by an edge which is disposed ahead of the stretching and blowing apparatus 40. The edge 30 in relation to the first conveying installation 1 is preferably disposed so as to be locationally fixed and laterally offset such that the hangers 150 of the preforms 100 are moved by movement of the first conveying installation 1 against the edge 40, are brought to bear thereon and bent. When viewed in the movement direction X, the edge 40 and the hanger 150 mutually overlap at least in portions. The bending apparatus 30 protrudes into the movement track of the hanger 150, so to speak. The hangers 150 in relation to the longitudinal axis L of the preforms are preferably bent to an angle of approx. $85° \leq \alpha \leq$ approx. $90°$, or of $\alpha \cong 90°$, or $\alpha = 90°$ (to this end, please refer to the added zoom at bottom left). The preforms which are now aligned and heated in a non-uniform manner are now transferred to the stretching and blowing apparatus 40.

FIGS. 3.*a* to 3.*c* visualize the procedure of stretching and blowing of a preform 100 in detail. The preform 100 is introduced into the mold 42 by way of an opening 41. By way of the second flange 112 the preform 100 comes to bear on the periphery of the opening 41 (refer to FIG. 3.*a*). The preform 100 is incorporated in the mold such that the more intensely heated sides are aligned toward the long side of the mold 42. The transverse axis $Q_H$ of the hanger 150 is transverse to the long side of the mold 42. The long side here is illustrated as being in the plane of the sheet.

The mold 42 on the lower side thereof is not configured so as to be planar. Said lower side, approximately so as to be centric, includes an elevation 43 or a type of plateau 43. A type of trench 44 extends along the circumference of the elevation 43. The trench has structures which enable the configuration of the feet 241 of the container 200. Overall, the mold 42 substantially is or may be a negative of the container 200. However, in particular the lower side of the mold 42 substantially is a negative of the lower side of the container 200 which is preferably not yet sterilized (to this end, please refer to FIGS. 5.*a* to 5.*f*). Preferably, the walls of the mold 42 are not actively heated. They are cold, so to speak.

A lance 45 which stretches the preform 100 along the longitudinal axis L thereof is introduced (refer to FIG. 3.*b*). The preform 100 here is stretched so far until the hanger 150 and/or at least a portion of the lower side 140 of the preform 100 come/comes to bear on the elevation 43. The base region 140 of the preform 100, by way of contact with the cold bearing 43, cools down and cannot substantially be blown any more. The lower side 140 of the preform 100 and later of the molded container 200 is thus thicker than the side walls of the container main body 230. Since the hanger 150 has previously been turned over, the former comes to bear in a defined manner on the elevation 43 of the mold 42 and on the lower side 140 of the preform 100. In particular, the hanger 100 may adhere to the lower side 140 of the preform 100 in a readily releasable manner. However, said hanger 100 may no longer come into substantial contact with the main body 230 of the container 200 that is yet to be blown.

In a next step, the stretched preform 100 is blown (refer to FIG. 3.*c*). The heated walls of the preform 100 expand, come to bear on the cold wall of the mold 42, and solidify. They also come to bear in the trench 44 which surrounds the elevation 43 in the mold 42, solidify there, and inter alia configure the feet 241 of the container 200. Those walls or regions of the preform 100 that are heated more intensely and are thus softer are more intensely expanded during blowing than the other walls or regions of the preform 100 that have been less intensely heated. The latter configure the two long sides and thus the width B of the container 200. Since these two sides are more intensely expanded, the former, proceeding from a preform 100 having a substantially identical wall thickness, have a smaller thickness than the other two sides which provide the short sides and thus the depth T of the container 200. After blowing, the mold 42 may be opened, the molded container 200 may be removed and be infed to the further steps (to this end, please refer to the description of FIG. 1 above).

The individual components will be specifically described in the following FIGS. 3.*a* to 7.

As a starting point, a preform 100 is illustrated in FIGS. 4.*a* and 4.*b*. The preform 100 is a body which is opened toward the upper side. The hanger 150 is disposed on the lower side of the preform 100. The preform 100 and the hanger 150 are integrally configured. They are produced as one by means of injection molding. The preform 100, ignoring the hanger 150, is preferably a rotationally symmetrical body. Such a body by means of injection molding may be produced in a rather simple and thus cost-effective manner. The illustrated preform 100 in this embodiment substantially comprises five regions.

An upper first region 110, comprising the opening 115, which then forms the container neck or bottleneck 210. This region is not substantially blown. Said region substantially retains the original wall thickness thereof. The opening 115 forms the inlet opening or opening in the bottleneck 210 of the container 200 to be molded from the preform 100. The opening 115 has a diameter of approx. 12 mm to approx. 38 mm. A first flange 111 and a second flange 112 are disposed below the opening 115. On account thereof, a first depression 113 is created between the two flanges 111 and 112. The second flange 112, lying toward the lower side, is wider than the upper first flange 112. The second flange 112 during stretching and blowing serves for placing onto the mold 42. Moreover, the second flange 112 serves as a bearing face for welding to a closure cap 300 (to this end, please refer to the description of FIGS. 6.*a* and 6.*b*). A second depression 114 is yet located below the second flange 112 in the external side of the preform 100. The two depressions 113 and 114 are not substantially stretched and blown. They are after all disposed in the region of the bottleneck 210. The first and the second depression 113 and 114, respectively, simplify handling of the preform 100 and of the molded container 200. For example, a gripper may securely hold the preform 100 by way of the first depression 113 and transfer said preform 100 to a second gripper which may retain and acquire the preform 100 by way of the second depression 114. The wall thickness here is in a range of approx. 1 mm to approx. 4 mm, for example. The length of the first region 110 in the direction of the central axis L is approx. 20 mm to approx. 30 mm. Said length is substantially independent of the overall size of the preform 100.

Furthermore, the preform 100 comprises a second region 120 which adjoins toward the lower side and which then forms the shoulder region 220 of the container 200. This region is at least partially blown. The shoulder region 220 of the molded container 200 then has a wall thickness which at least in portions decreases from the bottleneck 210 toward the third region 220. The wall thickness of the preform 100 in the second region 120 increases from the wall thickness in the first region 100 to the wall thickness in the third region 130. The length of the second region 120 in the direction of the central axis L is approx. 5 mm to approx. 10 mm. The length is substantially independent of the overall size of the preform 100.

The third region which then forms the main body 230 of the container 200 adjoins toward the lower side. To this end, this third region 130 is substantially fully blown. Said third region 130 then has the thinnest wall thickness in the molded container 200. Said wall thickness, however, is not uniform, since the preform 100 is heated with variable intensity and, on account thereof, is then expanded with variable intensity during blowing (to this end, please refer to the description of FIGS. 3.a to 3.c). The wall thickness here in the third region 130 of the preform 100 is greater than the wall thickness in the first region 110. The wall thickness of the preform 100 in the third region 130 along the circumference of the preform 100 and along the height is substantially constant. Said wall thickness here is in a range of approx. 2 mm to approx. 3.5 mm, for example. The actual preform in this region has a tapered cross section. The length of the third region 130 in the direction of the central axis L is approx. 80 mm to approx. 250 mm. The length of the third region 130 is chosen so as to be dependent on the size of the container 200 to be molded. Using this length range, containers 200 having a capacity of approx. 100 ml to approx. 1000 ml may be produced.

Furthermore, the fourth portion 140 which then forms the base region 240 of the container 200 adjoins toward the lower side. The fourth region 140 is at least partially blown. The base region 240 of the molded container 200 has a wall thickness which from the main body 230 to the lower side 240 increases at least in portions. The wall thickness of the preform 100 is smaller than the wall thickness in the third region 130. Said wall thickness here is in a range of approx. 1 mm to approx. 2 mm, for example. The length of the fourth region 140 in the direction of the central axis L is approx. 15 mm to approx. 30 mm. The length is substantially independent of the overall size of the preform 100.

The hanger 150 is disposed on the base region 140 or on the lower side of the preform 100. The hanger 150 forms the fifth region 150. The hanger 150 in an exemplary manner is a closed hanger. Said hanger 150 is not blown. The wall thickness of said hanger is in the range of 1 mm to 3 mm, for example. The hanger 150 by way of a transition region 145 is connected to the base 140 or to the lower side 140 of the preform 100 and later of the molded container 200. The transition region 145 has a comparatively small wall thickness. The latter here is in a range of approx. 0.3 mm to approx. 1.5 mm, for example. The transition region 145 is flexural. The hanger 150 is thus disposed so as to be pivotable or flexural. The transition region 145 provides a type of film hinge. The transition 145 along the axis $Q_H$ is preferably rounded on both sides. In order for the mobility of the hanger 150 to be further improved, two lateral notches 146 are provided. These lateral notches 146 on the respective apex thereof are preferably rounded (refer to FIG. 4.b). On account thereof, flexure of the hanger 150 may in particular be further improved.

The length of the hanger 150 in the direction of the central axis $L_H$ is approx. 20 mm to 30 mm. The hanger 150 along the transverse axis $Q_H$ thereof has a width which, proceeding from the transition 145 along the longitudinal axis $L_H$, initially increases and then decreases again. On account thereof, the required transition 145 is provided, on the one hand, and a sufficiently large stop face for the bending apparatus 30 for turning over the hanger 150 is provided, on the other hand. The maximum length of the hanger 150 in the direction of the transverse axis $Q_H$ thereof is approx. 20 mm to 30 mm. The length and/or the width here are/is substantially independent of the overall size of the preform 100.

The container 200 molded from the preform 100 is a plastics bottle. The bottle 200 includes a bottleneck 210, a shoulder region 220, a main or bottle body 230, a base region 240, and the hanger 150. The container 200 may have a capacity of approx. 100 ml to approx. 1000 ml, for example.

FIGS. 5.a to 5.f show a molded container 200 which has not yet been filled, in various views. The shape of the molded body substantially mirrors the shape of the mold 42 in which the preform 100 has been blown. The shape and/or the contours of the container 200 may yet be varied on account of filling and/or sterilizing. For example, edges may be rounded and/or rounded features may yet be rounded further (to this end, please refer to FIGS. 7.a and 7.b).

As is the case with the preform 100 from which the container 200 has been molded, the container 200 comprises five regions. An upper first region 210 which comprises the opening 115 and which then forms the container neck or bottleneck. This region has not been substantially blown. Said region has substantially retained the original wall thickness and the structures of the preform 100, for example the first flange 111, the second flange 112, the first depression 113, and/or the second depression 114 in this region.

The container 200 furthermore comprises a second region 220 adjoining the lower side, which then forms the shoulder region of the container 200. This region is at least partially blown. The shoulder region 220 of the molded container 200 then has a wall thickness which from the bottleneck 210 to the third region 230 at least partially decreases. On account of blowing, the wall thickness of the preform 100 now decreases from the wall thickness in the first region 210 to the wall thickness in the third region 230.

The third region 230 which forms the main body 230 or the bottle body 230 of the container 200 adjoins the lower side. The container 200 in this portion has at least in portions a substantially elliptic cross section. The container is wider than it is deep. This third region 230 has been substantially fully blown. Said third region now has the thinnest wall thickness in the molded container 200. However, said wall thickness is not uniform along the circumference, since the preform 100 has been heated with variable intensity and, on account thereof, been expanded to a variable degree during blowing (refer to the description of FIGS. 3.a to 3.c). The sides which provide the longer width B of the container 200 are at least in portions thinner than the sides of the container 200 that provide the shorter depth T of the container 200. Moreover, an outwardly extending curvature 231 is provided in each case on the shorter sides. The curvature 231 in particular represents a type of molding, so as to enable the container 200 to adapt to the mold during sterilizing.

Ignoring the hanger 150 which is disposed on the base 140, the preform 100 is stretched along the longitudinal axis L thereof. The main body 130 of the preform 100 is blown and, on account thereof, stretched in such a manner that the wall thickness is at least in portions reduced. The preform 100 along the first transverse axis B thereof, which provides the width B of the container 200, is stretched more intensely than along the second transverse axis T which provides the depth of the container 200. Therefore, the wall thickness of the long sides of the container 200 that provide the width of the container 200 is at least in portions thinner by a factor of approx. 1.5 to 5 than the wall thickness of the short sides of the container 200 that provide the depth of the container 200.

Furthermore, the fourth region 240 which forms the base region 240 of the container 200 adjoins the lower side. This fourth region 240 has at least been partially blown. The base region 240 of the molded container 200 has a wall thickness which from the main body 230 to the lower side 240 increases at least in portions. The wall thickness of the container 200 in the fourth region 240 is greater than the wall thickness in the third region 230.

The hanger 150 is disposed on the base region 240 or on the lower side 240 of the container 200. The hanger 150 forms the fifth region 250. Said hanger 150 is not blown. Said hanger 150 has substantially retained the properties thereof. However, bending the hanger prior to infeeding to the mold 42 for stretching and blowing results in the transition region in the material on that side of the hanger 150 that faces away from the lower side 240 of the container 200 being stretched, on the one hand. On the other hand, this results in the material on that side of the hanger 150 that is assigned to the lower side 240 of the container 200 being bulged.

At least one foot 241 is disposed or configured along the circumference of the hanger 150. Here, four feet 241 are configured in an exemplary manner in the base region 240. Said four feet 241 are disposed so as to be distributed along the circumference. Said four feet 241 are preferably configured in a stepped manner. The height of the feet 241 is chosen such that the hanger 150 in a state in which it is placed against the lower side 240 of the container 200 lies above the bearing point of the feet 241 on a firm base. On account thereof, the hanger 150 is surrounded and shielded by the feet 241 such that the former cannot adhere to the main body 230 when the container 200 is blown, on the one hand. On the other hand, said hanger 150 cannot substantially impede the tilting stability of the container 200.

A potential embodiment of a closure 300 for closing the container 200 is illustrated in FIGS. 6.a and 6.b. The closure 300 is embodied as a closure cap. The latter is placed onto the bottleneck 210 of the container 200 and hermetically closes the interior of the container 200. When the closure cap 300 is placed, the inboard periphery 303 comes to bear on the second flange 112 of the container 200. The first flange 111 may serve as a guide (refer to FIG. 5.b). In one preferred design embodiment, the closure cap 300 is welded to the container 200. To this end, at least the inboard periphery 303 of the closure cap 300 and/or the second flange 112 of the container 200 are heated in a corresponding manner and welded to one another.

The closure cap 300 here in an exemplary manner has two accesses 301 and 302 to the interior of the container 200. A first access 301 for removal of liquid, preferably by means of a spike, and a second access 302 for adding liquid, for example an active ingredient to be diluted. The two accesses 301 and 302 are preferably in each case closed using a septum (not shown in the figure) and using a tamperproof seal. The two tamperproof seals here in an exemplary manner are configured as tear-off and/or twist-off parts, having corresponding arrows identifying removal or addition.

Finally, FIGS. 7.a and 7.b show a container 200 according to the invention prior to (FIG. 7.a) and post sterilizing (FIG. 7.b), said container 200 here in an exemplary manner being closed using the closure cap 300 illustrated in FIGS. 6.a and 6.b. The container 200 is inflated by sterilizing. It can be seen that the shape and/or the contours of the container 200 have been modified by sterilizing. For example, the edges are rounded and/or rounded features have been furthermore rounded. In particular, the edges in the region of the base 240 are somewhat rounded. Moreover, the stepped shape of the feet 241 is less pronounced or has been substantially completely lost. Furthermore, the curvature 231 which represents a type of molded region is now more intensely rounded. On account thereof, the depth of the container 200 has increased. Furthermore, stretch marks may have been configured in the region of the main body 230. Depending on the capacity thereof, the container 200 which is preferably configured as a bottle may have a height of approx. 10 cm to approx. 30 cm, a width of approx. 5 cm to 15 cm, and/or a depth of approx. 3 cm to approx. 8 cm.

It will be apparent to a person skilled in the art that the embodiments described are to be understood to be exemplary. The invention is not limited thereto but may be varied in many ways without departing from the concept of the invention. Features of individual embodiments and the features mentioned in the general part of the description may in each case be combined with one another.

LIST OF REFERENCE SIGNS

1 First conveying installation
X Movement direction of the first conveying installation
2 Rotary pin
10 Heating installation
11 First portion of the heating installation
12 Second portion of the heating installation
20 Monitoring system
30 Bending apparatus, or edge
40 Stretching and blowing apparatus
41 Introduction opening in the mold of the stretching and blowing apparatus
42 Mold of the stretching and blowing apparatus
43 Plateau or elevation on the base of the mold
44 Trench in the base of the mold
45 Lance for stretching or elongating
100 Preform
110 First portion of the preform
111 First flange
112 Second flange
113 First depression
114 Second depression
115 Opening, or filling opening
120 Second portion of the preform
130 Third portion of the preform
140 Fourth portion of the preform
145 Transition region
146 Notch
150 Hanger on the preform or on the container, or fifth portion of the preform
$Q_H$ Transverse axis of the hanger
$L_H$ Longitudinal axis of the hanger
α Bending angle of the hanger (angle between the longitudinal axis of the hanger and the longitudinal axis of the preform)
200 Container, or bottle
210 First portion or bottleneck of the container
220 Second portion or shoulder region of the container
230 Third portion, or main body, or bottle body of the container
231 Curvature or molding on the container
240 Fourth portion or base region of the container
241 Foot
250 Fifth region or hanger of the container
L Longitudinal axis of the preform and/or of the container
B First transverse axis along the width of the preform and/or of the container
T Second transverse axis along the depth of the preform and/or of the container
300 Closure, or closure cap
301 First access for removing a liquid
302 Second access for adding a liquid
S100 Providing the preform S200 Heating and aligning the preform
S300 Bending the hanger
S400 Stretching and blowing the preform
S500 Cleaning and optionally drying the container
S600 Filling the container
S700 Closing the container
S800 Sterilizing the container
S900 Checking and/or labeling the container, and/or disposing a multiplicity of containers in a carton, and closing the carton

The invention claimed is:

1. A system for producing a container filled with an infusion solution, the system comprising:
   a first installation for providing a preform having a hanger disposed on a base of the preform;
   a heating installation for heating the provided preform;
   an apparatus for stretching and blowing the preform such that the container for the infusion solution is moldable from the preform;
   a second installation for cleaning the molded container, wherein the second installation is configured to dry the cleaned container;
   a filling system in which the cleaned and optionally dried container by way of a filling opening which is present in the container may be filled at least with one infusion solution;
   a third installation for closing the container;
   an autoclave in which the closed container is sterilizable;
   a first conveying installation for guiding the preform in the heating installation and for infeeding the heated preform to the stretching and blowing apparatus in which the preform may be rotatably mounted and aligned by way of rotation, and a bending apparatus which is disposed ahead of the stretching and blowing apparatus and in which the preferably pre-aligned hanger of the preform may be turned over.

2. The system as claimed in claim 1, wherein
   the first conveying installation has at least one movably disposed rotary pin on which the preform is mountable and by way of which rotation of the preform is providable, and/or
   the bending apparatus is providable by an edge which is disposed ahead of the stretching and blowing apparatus, for example in or after the heating installation-and which in relation to the first conveying installation is disposed so as to be locationally fixed and laterally offset such that the hanger of the preform by means of a movement of the first conveying installation may be moved against the edge, be brought to bear and bent thereon.

3. The system as claimed in claim 1, wherein the first installation is configured to provide the preform aligned such that a transverse axis ($Q_H$) of the hanger lies so as to be substantially transverse.

4. The system as claimed in claim 3, wherein the first installation is configured to provide the preform aligned such that a transverse axis ($Q_H$) of the hanger lies perpendicularly to a movement direction (X) of the preform.

5. The system as claimed in claim 1, wherein the first installation is configured to provide the preform such that the hanger of the preform is placed away from a longitudinal axis (L) of the preform in the direction of the base of the preform.

6. The system as claimed in claim 1, wherein the first installation is configured to align the preform such that a transverse axis (T) of the container is disposed in the heating installation so as to be substantially transverse.

7. The system as claimed in claim 6, wherein the first installation provides the preform perpendicularly to a movement direction (X) of the preform.

8. The system as claimed in claim 1, wherein the heating installation is configured to heat the preform such that two mutually opposite regions of the preform that extend in the direction of a first transverse axis (B) of the container molded from the preform are heated more intensely than two mutually opposite regions of the preform that extend in the direction of a second transverse axis (T) of the container molded from the preform.

9. The system as claimed in claim 1, wherein the heating installation is configured to heat the preform such that the preform along a circumference thereof is heated in a substantially uniform manner, and a first set of two mutually opposite regions of the preform that extend in the direction of a first transverse axis (B) of the container molded from the preform are provided with a thinner wall thickness than a second set of two mutually opposite regions that extend in the direction of a second transverse axis (T) of the container molded from the preform.

10. The system as claimed in claim 1, wherein the heating installation is configured to initially heat the preform, such that, at least in a region that forms the main body of the container molded from the preform, is heated in a substantially uniform manner, and two mutually opposite regions of the preform which then provide the sides of the container molded from the preform which extend in the direction of a first transverse axis (B) prior to infeeding to the stretching apparatus and the blowing apparatus are heated more intensely.

11. A system for producing a container filled with an infusion solution, the system comprising:
   a first installation for providing a preform having a hanger disposed on a base of the preform;
   a heating installation for heating the provided preform;
   an apparatus for stretching and blowing the preform such that the container for the infusion solution is moldable from the preform;
   a second installation for cleaning the molded container;
   a filling system in which the cleaned and optionally dried container by way of a filling opening which is present in the container may be filled at least with one infusion solution;
   a third installation for closing the container,
   an autoclave in which the closed container is sterilizable; and
   a first conveying installation for guiding the preform in the heating installation and for infeeding the heated preform to the stretching and blowing apparatus in which the preform may be rotatably mounted and aligned by way of rotation, and a bending apparatus which is disposed ahead of the stretching and blowing apparatus and in which the preferably pre-aligned hanger of the preform may be turned over, wherein:
      the first conveying installation has at least one movably disposed rotary pin on which the preform is mountable and by way of which rotation of the preform is providable, and/or
      the bending apparatus is providable by an edge which is disposed ahead of the stretching and blowing apparatus, for example in or after the heating installation-and which in relation to the first conveying installation is disposed so as to be locationally fixed and laterally offset such that the hanger of the preform by means of the movement of the first conveying installation may be moved against the edge, be brought to bear and bent thereon.

12. The system as claimed in claim 11, wherein the second installation is configured to dry the cleaned container.

13. The system as claimed in claim 11, wherein the first installation is configured to provide the preform aligned such that a transverse axis ($Q_H$) of the hanger lies so as to be substantially transverse.

14. The system as claimed in claim 13, wherein the first installation is configured to provide the preform aligned such that a transverse axis ($Q_H$) of the hanger lies perpendicularly to a movement direction (X) of the preform.

15. The system as claimed in claim 11, wherein the first installation is configured to provide the preform such that the hanger of the preform is placed away from a longitudinal axis (L) of the preform in the direction of the base of the preform.

16. A system for producing a container filled with an infusion solution, the system comprising:
    a first installation for providing a preform having a hanger disposed on a base of the preform, wherein:
        the first installation is configured to provide the preform aligned such that a transverse axis ($Q_H$) of the hanger lies so as to be substantially transverse, and
        the first installation is configured to provide the preform aligned such that a transverse axis ($Q_H$) of the hanger lies perpendicularly to a movement direction (X) of the preform;
    a heating installation for heating the provided preform;
    an apparatus for stretching and blowing the preform such that the container for the infusion solution is moldable from the preform;
    a second installation for cleaning the molded container;
    a filling system in which the cleaned and optionally dried container by way of a filling opening which is present in the container may be filled at least with one infusion solution;
    a third installation for closing the container,
    an autoclave in which the closed container is sterilizable; and
    a first conveying installation for guiding the preform in the heating installation and for infeeding the heated preform to the stretching and blowing apparatus in which the preform may be rotatably mounted and aligned by way of rotation, and a bending apparatus which is disposed ahead of the stretching and blowing apparatus and in which the preferably pre-aligned hanger of the preform may be turned over.

17. The system as claimed in claim 16, wherein the second installation is configured to dry the cleaned container.

18. The system as claimed in claim 16, wherein
    the first conveying installation has at least one movably disposed rotary pin on which the preform is mountable and by way of which rotation of the preform is providable, and/or
    the bending apparatus is providable by an edge which is disposed ahead of the stretching and blowing apparatus, for example in or after the heating installation-and which in relation to the first conveying installation is disposed so as to be locationally fixed and laterally offset such that the hanger of the preform by means of a movement of the first conveying installation may be moved against the edge, be brought to bear and bent thereon.

19. The system as claimed in claim 16, wherein the first installation is configured to provide the preform such that the hanger of the preform is placed away from a longitudinal axis (L) of the preform in a direction of the base of the preform.

20. The system as claimed in claim 16, wherein the first installation is configured to align the preform such that a second transverse axis (T) of the container is disposed in the heating installation so as to be substantially transverse.

* * * * *